C. M. EWING AND H. N. BRYAN.
BEET AND VEGETABLE HARVESTER.
APPLICATION FILED AUG. 10, 1920.

1,417,309.

Patented May 23, 1922.
2 SHEETS—SHEET 1.

WITNESSES

INVENTORS:
Charles M. Ewing
Herbert N. Bryan.
BY
ATTORNEYS

C. M. EWING AND H. N. BRYAN.
BEET AND VEGETABLE HARVESTER.
APPLICATION FILED AUG. 10, 1920.
1,417,309.
Patented May 23, 1922.
2 SHEETS—SHEET 2.
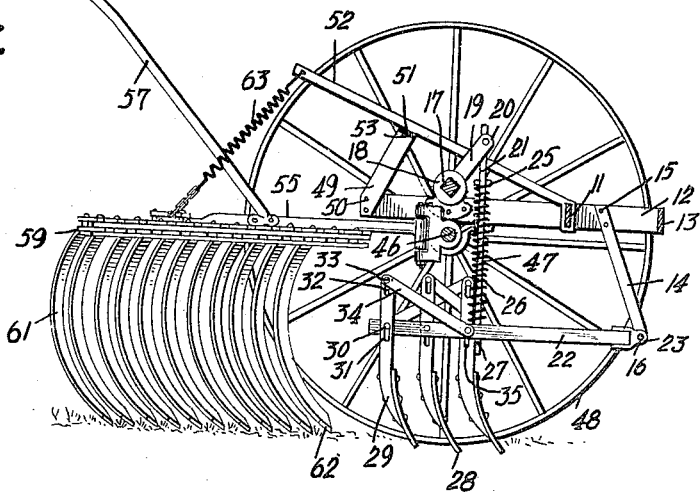
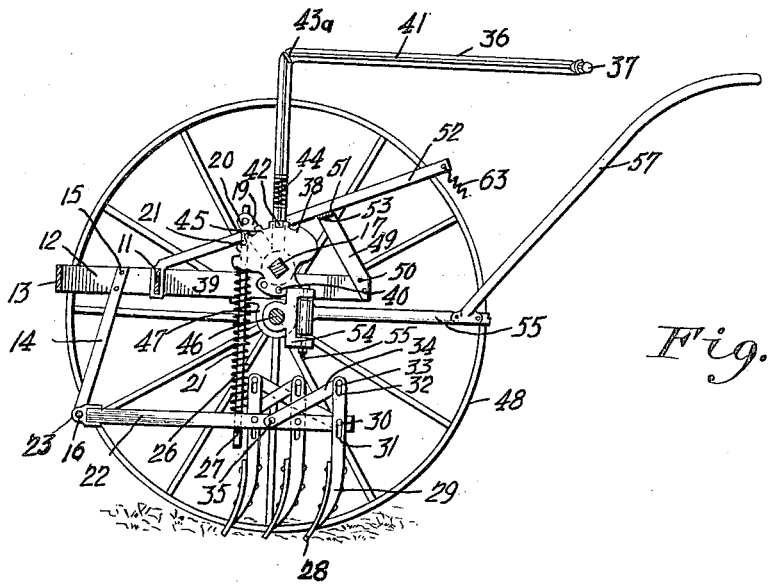
WITNESSES
INVENTORS
Charles M. Ewing,
Herbert N. Bryan,
BY
ATTORNEYS

UNITED STATES PATENT OFFICE.

CHARLES M. EWING AND HERBERT N. BRYAN, OF DEWEYVILLE, OHIO.

BEET AND VEGETABLE HARVESTER.

1,417,309.   Specification of Letters Patent.   Patented May 23, 1922.

Application filed August 10, 1920. Serial No. 402,524.

*To all whom it may concern:*

Be it known that we, CHARLES M. EWING and HERBERT N. BRYAN, both citizens of the United States, and residents of Deweyville, county of Hancock, and State of Ohio, have invented a new and Improved Beet and Vegetable Harvester, of which the following is a full, clear, and exact description.

This invention relates to implements for harvesting beets, vegetables, and the like, and has reference more particularly to an implement adapted to dig beets or vegetables from the ground and pile them in a windrow convenient for further operations.

An object of this invention is to provide an implement for harvesting beets and vegetables which will eliminate hand labor and will thoroughly gather the crop from several rows to a single windrow or pile ready for further operations.

Another object of this invention is to provide a beet harvester which will gather the sugar beets from the ground with a great saving of time and a minimum of labor and expense.

A further object of this invention is to provide an implement of the class indicated in which the various parts are adjustable so as to be adapted for a variety of conditions.

Reference is to be had to the accompanying drawing forming a part of this specification in which it is understood that the drawing illustrates only one form of the invention, and in which—

Figure 2 is a sectional view through the harvester on the line 2—2 of Figure 1.

Figure 3 is a sectional view of the harvester on the line 3—3 of Figure 1.

Figure 1:
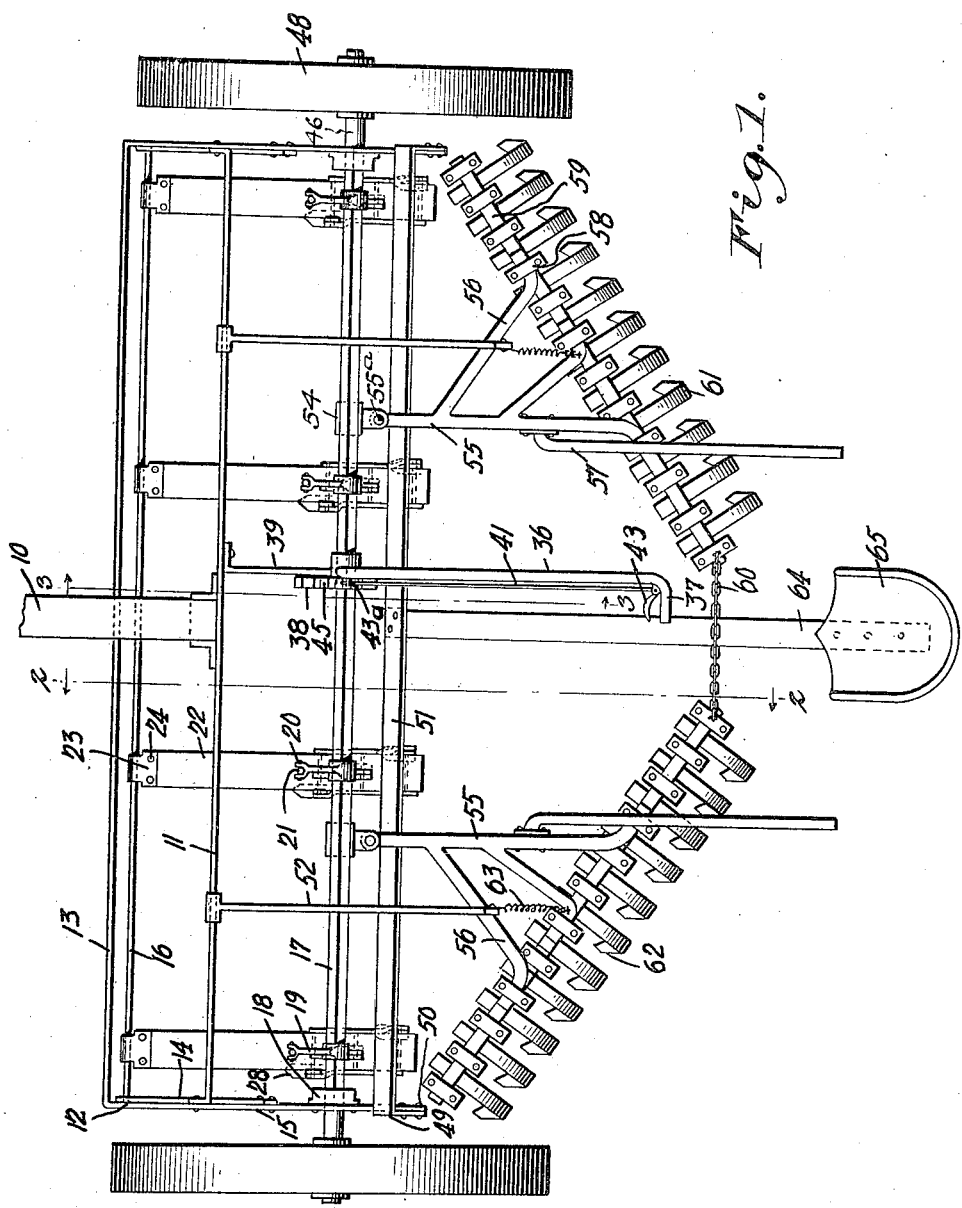
Figure 1 is a plan view of my improved harvester.

Referring to the accompanying drawing by numerals, 10 indicates the tongue of the implement which may be attached to any suitable traction means such as a tractor, horses, etc. The tongue 10 is secured rigidly to a laterally extending framework 11 secured at each end to a longitudinal framework 12. The longitudinal frames 12 are connected at their forward end by a brace 13, and an oblique strut 14 extends downwardly and forwardly from each of the frames 12 and is secured thereto by rivets 15. A bar 16 which may be circular in cross section extends between and is secured to the lower ends of the struts 14. A rock shaft 17, preferably square in cross section, extends laterally of the implement and is journaled at each end in suitable bearings 18 secured to the frame 12.

A plurality of levers 19 preferably four in number, is secured to and equally spaced along the shaft 17, each lever being substantially vertically above a row of vegetables or sugar beets. The free end of each lever 19 is provided with a fork 20 which pivotally receives a substantially vertical rod 21. A plurality of beams 22 is slidably secured at one end to the rod 16 by means of bearings 23, each bearing being secured thereto by bolts 24.

Each of the rods 21 extends through a slot not shown, in one of the beams 22, and a laterally extending pin 25 passes through each rod 21 adjacent the fork 20. A coil spring 26 embraces each rod 21 between the pin 25 and the beam 22, and a pin 27 passes laterally through said rod below said beam so as to limit the downward movement of said beam about the rod 16 under the action of the spring 26. A plurality of shovels 28 preferably three in number is carried by each beam 22, the shovels being secured to the lower end of a bar 29, said bars being slidably connected adjacent their upper end to the rearward end of the beams 22 by means of bolts 30 engaging slots 31 in said bars 29. A slot 32 is formed in the upper end of each bar 29, and a bolt 33 connects said bar 29 to a link 34, the end of each link 34 opposite the bolt 33 being pivotally connected by a bolt 35 to the beam 22. The purpose of the slots 31 and 32 is to permit vertical adjustment of the bars 29 and shovels 28, and the latter are held in place by tightening the bolts 30 and 33.

A lever 36 is secured at one end to the shaft 17 and is provided at its other end with a laterally extending handle 37. A quadrant 38 is secured to a strut 39 of the framework 11 by rivets 40, and a cable 41 connects a catch 42 to a grip 43 pivotally connected adjacent the handle 37. The lever 36 is preferably bent at right angles so as to be convenient to the operator of the implement, and a loop 43ª is secured to said lever serving to guide the cable 41. A spring 44 is connected in the usual manner to the catch 42 so as to maintain said catch normally in contact with teeth 45 of the quadrant 38. By manipulating the hand grip 43 and rocking the lever 36, the rock shaft 17 moves the levers 19 so as to vary the position of the shovels 28 at the will of the operator.

An axle 46 extends laterally of the implement and is suitably mounted in bearings 47 secured to the frame work 12, and a wheel 48 is rotatably mounted at each end of said axle, said wheels serving to transport the implement from place to place. Braces 49 extend obliquely upwardly and forwardly being secured at their lower end to the rear end of the frames 12 by rivets 50. A bar 51 extends laterally between the upper ends of the braces 49, and an oblique supporting bar 52 is secured at its forward end to the framework 11 while it rests adjacent its rear end on the bar 51 being secured thereto by rivets 53.

A pair of yokes 54 is pivotally connected to the axle 46 one on each side of the center of said axle and a framework 55 is pivotally connected between the arms of each yoke 54 by a bolt 55ᵃ, so that the framework 55 is free to swing in a horizontal and vertical plane with a universal movement. The frames 55 extend rearwardly and are provided with oblique arms 56, and with handles 57 adapted to be grasped by the operator in controlling the position of the frames 55. The outer ends of the arms 56 are secured by clips 58 to a structural frame 59, each of the two frames 59 being positioned so that its rearward end slopes rearwardly at an angle to the tongue 10. The rearward ends of the frames 59 are connected by a chain 60 which serves to limit the distance between said frames. A series of arcuate arms 61 is supported on each frame 59, and a shovel 62 is formed on the lower end of each arm 61, each shovel being directed substantially parallel to the tongue 10 and to the direction of motion of the implement. A coil spring 63 connects the rearward end of each bar 52 with a frame 59 so as to resiliently support the latter in movable position relative to the surface of the ground. A bar 64 extends rearwardly from and is secured to the bar 51, and a seat 65 for the operator is secured to the outer end of said bar 64.

In operation the implement is drawn by the tongue 10 on the ground so that the shovels 28 dig up each row of vegetables or sugar beets from the ground, depositing them upon the surface thereof. The series of shovels 62 and arms 61 then gather up the sugar beets and move them inwardly to form a single row directly under the chain 60 as the implement moves along the ground. The distance which the shovels 28 extend into the ground is adjusted by movement of the lever 36, and the movement of the frames 55 and shovels 62 relative to the rows of vegetables is regulated by the operator seated on the seat 65 who grasps the handles 57.

We would state in conclusion that while the illustrated example constitutes a practical embodiment of our invention, we do not limit ourselves strictly to the mechanical details herein illustrated, since manifestly the same can be considerably varied without departure from the spirit of the invention as defined in the appended claims.

Having thus described our invention, we claim as new and desire to secure by Letters Patent:

1. In an apparatus for harvesting vegetables, a frame element, means for transporting said frame element over the ground, a plurality of beams supported by said frame element and provided with shovels adapted to dig vegetables in a plurality of rows from the ground as said frame element is moved, and two independently and pivotally mounted means carried by the frame element for gathering said vegetables from said plurality of rows and depositing said vegetables in a single row as said frame element is moved.

2. In an apparatus for harvesting vegetables, a frame element, means for transporting said frame element over the ground, a plurality of yieldable beams supported by said frame element and each provided with a plurality of shovels adapted to dig vegetables in a row from the ground as said frame element is moved, means associated with said frame element for adjusting the position of said shovels relative to the ground, and two independently and pivotally mounted frames carried by said frame element and provided with members adapted to gather the vegetables from said plurality of rows and deposit said vegetables in a single row as said frame element is moved.

3. In an apparatus for harvesting vegetables, a frame element, means for transporting said frame element over the ground, a plurality of shovels supported by said frame element adapted to dig vegetables in a plurality of rows from the ground as said frame element is moved, a plurality of frameworks supported from said frame element, and a plurality of arcuate arms supported from each framework, each arm having a shovel on its lower end positioned longitudinally of said apparatus and adapted to gather the vegetables in said plurality of rows and deposit said vegetables in a single row.

4. A device as described in claim 3 characterized by said framework being universally and movably connected to said frame element, and means for manually moving said framework relative to said frame element.

5. A device as described in claim 3 characterized by resilient means adapted to maintain said frame work in movable relation to the surface of the ground.

6. In an apparatus for harvesting vegetables, a frame element, means for moving said frame element from place to place, a plurality of beams pivotally supported at one end on said frame element and positioned substantially parallel to the direction of motion of said apparatus, a plurality of shovels connected to one end of each beam, means for moving said beams and said shovels relative to said frame element, said shovels being adapted to dig vegetables in a plurality of rows from the ground as said frame element is moved, and means supported from said frame element adapted to gather said vegetables from said plurality of rows and deposit said vegetables in a single row as said frame element is moved.

7. In an apparatus for harvesting vegetables, a frame element, means for moving said frame element from place to place, a rock shaft movably supported by said frame element substantially transversely to the direction of motion of said frame element, a plurality of beams each pivotally supported at one end by said frame element, a plurality of levers secured to said rock shaft, connecting means between said levers and said beams adapted to rock said beams about their pivots when said rock shaft is actuated, a plurality of shovels secured to each beam, said shovels being adapted to dig vegetables in a plurality of rows from the ground, means for actuating said rock shaft so that the position of said shovels relative to the ground is changed, and means supported by said frame element adapted to gather said vegetables from the plurality of rows after they have been dug from the ground by said shovels, and deposit said vegetables in a single row.

CHARLES M. EWING.
HERBERT N. BRYAN.